May 2, 1967  L. Q. HINES  3,316,978
PEANUT HARVESTING MACHINE
Filed Jan. 11, 1965
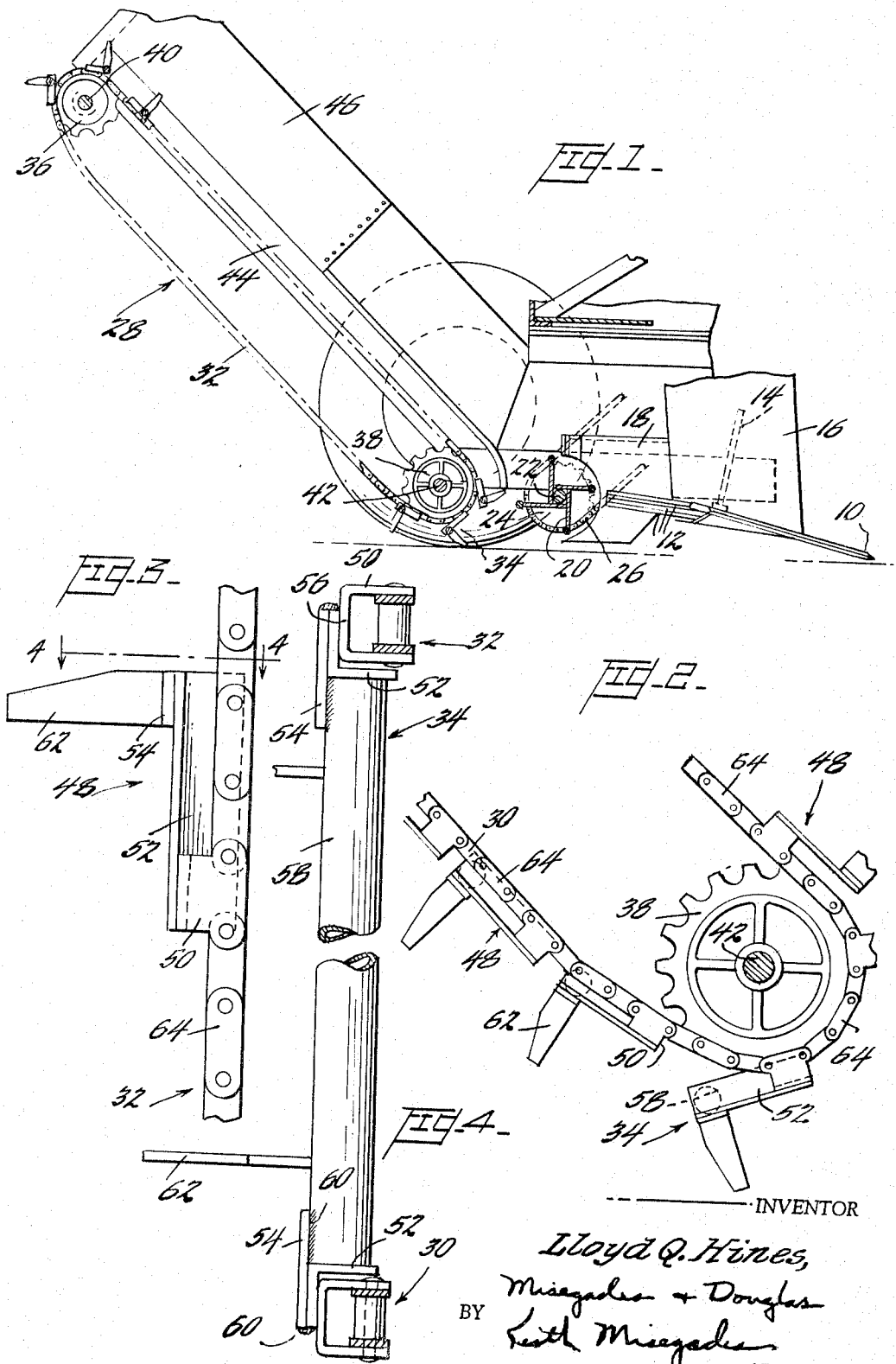
INVENTOR
Lloyd Q. Hines,
BY Misegades & Douglas
Keith Misegades
ATTORNEYS

United States Patent Office 3,316,978
Patented May 2, 1967

3,316,978
PEANUT HARVESTING MACHINE
Lloyd Q. Hines, P.O. Box 1098, Suffolk, Va. 23434
Filed Jan. 11, 1965, Ser. No. 424,634
4 Claims. (Cl. 171—101)

This invention relates to a peanut harvesting machine, and, in particular, to the conveyor mechanism portion thereof.

The invention has particular significance when applied to a peanut harvester of the type disclosed in my prior Patent #2,997,114, issued Aug. 22, 1961. Said peanut harvester is directed to the special problems encountered in the harvesting of peanuts. Unlike the harvesting of other root crops, it is desirable to remove the peanuts and their vines together from the ground, being careful to retain the peanuts on the vines. It is then wise to gently remove any clinging earth from the peanuts and vines, convey the peanuts and vines to the rear of the harvester, and finally to drop the same from the harvester so that the uprooted peanuts face upwardly from the vines so as to be effectively dried.

The present invention is directed to a peanut harvester conveyor of the type discussed above. The use of my prior invention has shown the practicability of providing a conveyor that will cleanly and effectively withdraw the peanuts and vines from the working members of the harvester so as to prevent entanglement of the vines therewith. It is further desirable to impart a slight throwing action to the rear of the conveyor, as such action will further insure that the vines will fall so as to expose the peanuts for drying.

Further and more complete objects and advantages of the present invention may be had by reference to the following specification and accompanying drawings in which:

FIGURE 1 is a partial, vertical section of the device disclosed in my above mentioned prior patent, showing the relationship of the present invention thereto;

FIGURE 2 is a partial view of the invention, taken from the lower central portion of FIGURE 1, and drawn to an enlarged scale;

FIGURE 3 is an enlarged side view of one member of the invention; and

FIGURE 4 is a sectional view, taken along lines 4—4 of FIGURE 3.

Referring now to the drawings by reference character, and, in particular, to FIGURE 1 thereof, there is shown the interior working members of a peanut harvester of the type above discussed.

One-half of the device includes a plow blade 10 with a series of longitudinal bars 12 secured rearwardly thereof. A yoke mechanism, generally indicated at 14, is used to angularly adjust the placement of blade 10 with respect to the ground. A pair of fenders, indicated at 16 and 18, are placed along the interior side wall of the harvester so as to prevent vine entanglement with the device. A laterally extending beater 20 is mounted immediately rearwardly of the ends of bars 12. The beater 20 is secured about shaft 22, which is driven by means of a gear 24 and chain 26. Chain 26 is driven from a gear box mounted on a forward end of the harvester (not shown), the gear box being secured to the power take-off of a tractor (not shown) which is used to pull the harvester. A conveyor assembly 28 is secured to the rear of beater 20.

The operation of the parts of the peanut harvester just described is as follows. Plow blade 10 slices forwardly and angularly into the ground, thereby lifting peanuts, vines, and earth. The earth then moves rearwardly over bars 12, falling away if it is dry. If the earth is moist, then it will continue to beater 20, which, as it rotates, will gently remove clinging earth from the peanuts and vines while at the same time transferring them from bars 12 to conveyor asembly 28. The conveyor then moves the peanuts and vines to the rear of the harvester where they are dropped.

The present invention, as previously discussed, is directed to an improvement in the conveyor assembly 28. The conveyor is of the open type, including a pair of chains 30, 32, having a plurality of flights 34 secured therebetween. The chains are secured for rotatable movement of about a pair of upper sprocket wheels 36 and lower sprocket wheels 38. Upper sprockets 36 are mounted about a rotatable shaft 40 which is driven by suitable take-off means from the harvester gear box (not shown). Lower sprockets 38 are mounted upon an idler shaft 42. Shafts 40 and 42 are fixed in side angle bars 44 of the conveyor by suitable bearings. In addition, the conveyor may include a pair of shields 46, mounted over chains 30, 32, so as to protect the chains from becoming entangled with the peanut vines as they are conveyed to the rear of the harvester.

Turning now to FIGURES 2 through 4 in particular, the instant invention will be discussed. The invention concerns a novel bracket means 48 for securing flights 34 to chains 30, 32. Bracket means 48 comprises modified chain link element 50, extended angle iron 52, and bracing piece 54. As indicated in FIGURE 4, modified link element 50 replaces one of the outer links of chains 30, 32, and is formed with a cross piece 56 spaced a sufficient distance from the chain so as to prevent binding of the chain as it passes over one of the sprocket wheels. Angle iron 52 is secured at one end to modified link 50, exteriorly thereof, as by bolts, welding, or any other suitable means. Cross bar 58 of flight 34 is mounted between laterally mating pairs of angle irons 52, at the free ends thereof, as by welding 60. Further rigidity is assured by the pair of bracing pieces 54 which are welded to the horizontal faces of angle irons 52 and to cross bar 58. Each cross bar 58 includes a plurality of vine engaging points 62 which engage the peanut vines as they are conveyed to the rear of the harvester. The number of flights required for the conveyor has not been found to be crucial, but maximum efficiency is assured by providing at least one flight 34 between each alternative outer link 64 of chains 30, 32.

Referring now to FIGURES 1 and 2 in particular, the operation of the invention will be discussed. As each flight 34 approaches a pair of mating sprocket wheels, 38, it will be forced outwardly with respect to the axis of shaft 42 as chains 30, 32 move about sprockets 38. This movement is caused by the displacement of modified link 50 with respect to the remainder of chains 30, 32, not in the vicinity of the sprockets. This movement thereby causes a momentary acceleration of vine engaging points 62 in the proximity of beater 20. As flight 34 completes its travel about sprockets 38, modified link 50 thereof will begin to assume a normal position with respect to the remainder of chains 30, 32. This movement in turn causes beater a momentary deceleration of points 62 as they pass 20 and grasp the vines therefrom. This movement assures an extremely smooth transfer of peanut vines from beater 20 to the conveyor, thereby minimizing the possibility of damage to the vines. At the upper end of conveyor 28, a corresponding movement occurs in the vicinity of sprockets 36. As each flight 34 passes over sprockets 36, the momentary acceleration described above will impart a slight tossing action to the conveyor, thereby assuring a clean removal of the peanut vines from the conveyor. Additionally, experience has shown that slight tossing action allows the peanut vines to fall so that the peanut will lay above its vine.

It is evident from the foregoing that I have invented a new and useful device in the art of peanut harvesting, and therefore, I am not to be limited to the exact construction provided herein, except as the be within the scope of the following claims.

I claim:

1. In a peanut digger including means for uprooting peanut vines, an open conveyor, for transporting said vines upwardly and rearwardly of said digger, comprising a pair of sprocket driven chains supported on said digger, a plurality of cross members each having a plurality of vine engaging points thereon, and bracket means rigidly securing said members to said chains, said bracket means arranged to deflect said cross members outwardly of the path of travel of said conveyor at the sprocket portions thereof, thereby momentarily accelerating the speed of said vine engaging points about said sprocket portions.

2. The device of claim 1 wherein said bracket means are secured one to each alternate outer link of said pair of sprocket-driven chains.

3. The device of claim 1 wherein each said bracket means includes a pair of supports secured to laterally corresponding links of said pair of chains, said supports extending longitudinally along the outer surface of said chains, said supports further having a length not less than the length of two links of said chain, one of said cross-members secured at the outer free ends of said supports.

4. The device of claim 3 wherein said free ends lie within a plane formed by said pair of chains when said cross-members are in a non-deflected attitude.

References Cited by the Examiner

UNITED STATES PATENTS 2,238,247   4/1941   Colwill _____ 171—101 X
2,997,114   8/1961   Hines _____ 171—116

ABRAHAM G. STONE, *Primary Examiner.*

ANTONIO F. GUIDA, *Examiner.*